United States Patent [19]

Fujii et al.

[11] Patent Number: 5,015,521

[45] Date of Patent: May 14, 1991

[54] POROUS FILM

[75] Inventors: Toshio Fujii; Kazuhiro Kato; Tasuku Suzuki, all of Kurashiki; Minoru Kashino, Yokohama, all of Japan

[73] Assignee: Mitsubishi Kasei Corporation, Tokyo, Japan

[21] Appl. No.: 470,893

[22] Filed: Jan. 26, 1990

Related U.S. Application Data

[63] Continuation-in-part of Ser. No. 468,872, Jan. 23, 1990.

[30] Foreign Application Priority Data

| Jan. 27, 1989 | [JP] | Japan | 1-19317 |
| Jan. 27, 1989 | [JP] | Japan | 1-19318 |
| May 24, 1989 | [JP] | Japan | 1-131096 |

[51] Int. Cl.$^5$ ............................. B32B 3/24; C08J 9/00
[52] U.S. Cl. ................................. 428/220; 521/134; 521/143
[58] Field of Search ............... 521/134, 143; 428/220

[56] References Cited

U.S. PATENT DOCUMENTS

| 3,705,812 | 11/1987 | Ito et al. | 521/143 |
| 3,870,593 | 3/1975 | Elton et al. | 521/143 |
| 4,705,813 | 11/1987 | Ito et al. | 521/143 |
| 4,791,144 | 12/1988 | Nagou et al. | 521/90 |
| 4,793,956 | 12/1988 | Nogiwa et al. | 521/134 |

*Primary Examiner*—Morton Foelak
*Attorney, Agent, or Firm*—Oblon, Spivak, McClelland, Maier & Neustadt

[57] ABSTRACT

Disclosed herein is a porous film having a thickness of 90 μm or less obtained by uniaxially stretching a film produced by blow-extruding a composition comprising a linear polyethylene, filler and a radical forming agent, the bending resistance of the porous film in both the machine and transverse directions being 50 mm or less, the moisture permeability of the porous film being 1500 g/m$^2$·24 hr or above, and the surface strength of the porous film satisfying the following relation (I):

$$\text{Surface strength } (kg) \geq 35 \times \text{film thickness } (mm) \quad \text{(I)}$$

and the process for producing the porous film defined above.

11 Claims, No Drawings

POROUS FILM

This application is a continuation-in-part of application Ser. No. 468,872, filed on Jan. 23, 1990.

BACKGROUND OF THE INVENTION

The present invention relates to a porous film and production thereof. More particularly, the invention relates to a porous film produced from a composition comprising a polyolefin and a filter and a process for producing the porous film, which film is suited for use as air-permeable sheet for medical use or other purposes.

Uniaxially stretching of films or sheets obtained by melt-forming a filler-blended polyolefin composition has been commonly practiced as a technique for producing porous films. However, porous films obtained in such conventional methods has problems in anisotropy of their properties, particularly relating to balance of tensile strength in the machine direction (stretching direction) and the transverse direction and in surface strength.

One method for improving anisotropy of film properties and surface strength is to form a porous film by stretching an unstretched film at as low a stretch ratio as possible. However, no satisfactory results have yet been obtained with this method.

Biaxial stretching of a unstretched film is also conceivable as a means for realizing said improvement, but this method involves problems of high equipment cost and strict control of operations because of the limited range of stretching conditions.

The present inventors have pursued the studies for eliminating these defects in the conventional porous films and providing a uniaxially stretched porous film which is well balanced in such properties as tensile strength and moisture preferably and also has high surface strength to enable greater reduction of thickness compared with conventional porous films, and as a result, the present inventors have accomplished the present invention.

SUMMARY OF THE INVENTION

In a first aspect of the present invention, there is provided a porous film having a thickness of 90 μm or less obtained by uniaxially stretching a film produced by blow-extruding a composition comprising a linear polyethylene, a filler and a radical forming agent, the bending resistance of the porous film in both the machine and transverse directions being 50 mm or less, the moisture permeability of the porous film being 1500 g/m²·24 hr or above, and the surface strength of the porous film satisfying the following relation (I):

Surface strength (kg) ≧ 35 × film thickness (mm)    (I)

In a second aspect of the present invention, there is provided a process for producing the porous film as defined above.

The porous film of the present invention has the specific properties such as mentioned above. More specifically, the film of this invention has a thickness of 90 μm or less, preferably in the range of 20 to 90 μm, and its surface strength is such as defined by the above-shown formula (I) (i.e., surface strength (kg) ≧ 35 × film thickness (mm)), so that the film, although very small in thickness, has sufficient surface strength to withstand practical use. Further, the moisture permeability (water vapor permeability) of the film is 1,500 g/m²·24 hr or above, preferably 2,000 g/m²·24 hr or above, so that the film is adequately permeable to water vapor and has no possibility of making the film-packaged substance stuffy with moisture. It is to be further noted that the bending resistance of the film in both machine and transverse directions is 50 mm or less. The film has therein minute pores having an average diameter of 0.05 to 5 μm at a porosity of 0.1 cc or more in terms of pore capacity per unit volume of 1 cm³, so that the film is soft and agreeable to the touch. The film of the present invention satisfying these property requirements finds a wide scope of useful applications such as clothing, medical substances, filter media, cell separators, etc.

DETAILED DESCRIPTION OF THE INVENTION

Linear polyethylenes usable in the present invention include linear low-density polyethylenes having a density of 0.91 to 0.95 g/cm³ and high-density polyethylenes having a density of 0.965 g/cm³ or below.

The linear low-density polyethylenes referred to herein are copolymers of ethylene and other α-olefins and different from the branched low-density polyethylenes produced by a conventional high-pressure process. Such as a linear low-density polyethylene can be produced, for example, by copolymerizing ethylene and other α-olefin such as butene, hexene, octene, decene, 4-methylpentene-1 and the like in an amount of about 4 to 17% by weight, preferably 5 to 15% by weight in the presence of a Ziegler catalyst or Phillips catalyst which is usually used in this production of medium- and low-pressure high-density polyethylenes. Thus, the linear low-density polyethylenes used in the present invention are of the type that the conventional high-density polyethylenes have been made into a structure with short chain branching by the copolymerization components, and the density is also reduced to the order of 0.91 to 0.95 g/cm³ by the short chain branching structure. Therefore, the linear low-density polyethylenes have a higher chain linearity than the conventional branched low-density polyethylenes and are of a structure having a greater number of branches than high-density polyethylenes.

The linear low-density polyethylenes are more excellent in strength properties such as tensile strength, impact strength and rigidity and are also more excellent in such characteristics as environmental stress cracking resistance (ESCR), heat resistance and heat-sealing characteristics than the high-pressure low-density polyethylenes produced by radical polymerization under high temperature and high pressure conditions, and the field of their use is expanding in recent years. Especially in the field of film, suspending of high-pressure low-density polyethylenes by linear low-density polyethylenes is advancing rapidly because of property superiority of the latter.

The linear polyethylene used in this invention is preferably selected from those having a melt index of 20 g/10 min or less, preferably 10 g/10 min or less, more preferably in the range of 0.1 to 5 g/10 min, and a flow ratio of 70 or less, preferably in the range of 10 to 50. When the melt index of the linear polyethylene is higher than 20 g/10 min, there results a reduction of tensile strength and surface strength. When the flow ratio exceeds 70, surface strength is lowered. It is also preferred that the inner polyethylene has a density of 0.910 to 0.965 g/cm³, preferably in the range of 0.915 to 0.930 g/cm³. When the density of the linear polyethylene is above 0.965 g/cm³, both impact resistance and flexibility are deteriorated. On the other hand, when the density is below 0.910 g/cm³, although the final film is excellent in flexibility, there takes place a degradation of porosity, dimensional stability and tensile strength.

In the present invention, melt index was determined in accordance with Condition 4 in Table 1 of JIS K-7210 which is reference standard of JIS K-6760. Flow ratio is the ratio of extrusion rage (g/10 min) under shearing force of $10^6$ dyne/cm² (load of 11,131 g) and that under shearing force of $10^5$ dyne/cm² (load of 1,113 g), and calculated from the following equation:

$$\text{Flow ratio} = \frac{\text{extrusion rate (10 min) under load of 11,131 g}}{\text{extrusion rate (10 min) under load of 1,131 g}}$$

Density was measured according to JIS K-6760.

Flow ratio is a measure of molecular weight distribution of the resin used. A small value of flow ratio signifies a narrow molecular weight distribution, while a large value of flow ratio denotes a wide molecular weight distribution.

In the present invention, the linear polyethylene alone may be used, but it is preferred to blend a specified amount of a branched low-density polyethylene with the linear polyethylene, because such blending is helpful to improve film-forming properties and stretchability.

The branched low-density polyethylenes that can be blended with the linear polyethylenes in the present invention include ethylene homopolymers and copolymers of ethylene and other copolymerizable compounds. Examples of the copolymerizable compounds are vinyl compounds such as vinyl acetate, ethyl acrylate and methyl acrylate, and olefins having 3 or more carbon atoms such as hexene, propylene, octene and 4-methylpentene-1. The amount of the copolymerizable compound in the ethylene copolymer is in the range of about 0.5 to 18% by weight, preferably about 2 to 10% by weight.

The branched low-density polyethylene used in this invention is preferably the one obtained by radical polymerization of ethylene or ethylene and other copolymerizable compound by using a radical forming agent such as oxygen, organic peroxide, etc., according to a conventional high-pressure process (1,000 to 3,000 kg/cm²).

The branched low-density polyethylene is preferred to have a melt index of 20 g/10 min or less, preferably in the range of 10 to 1 g/10 min, and a flow ratio of 70 or less, preferably in the range of 30 to 70. When the melt index exceeds 20 g/10 min, the final film is low in surface strength. The same is observed when the flow ratio is about 70.

It is also preferred that the branched low-density polyethylene used in this invention has a density of 0.930 g/cm³ or less, preferably in the range of 0.915 to 0.925 g/cm³, in view of improvement of surface strength.

As regards the amount of the linear polyethylene and branched low-density polyethylene to be blended, it is preferred that the branched low-density polyethylene be blended in an amount of 0 to 50 parts by weight, preferably 5 to 20 parts by weight, to 100 to 50 parts by weight, preferably 95 to 80 parts by weight of the linear low-density polyethylene.

The radical forming agent blended with the linear polyethylene and branched low-density polyethylene is preferably the one whose decomposition temperature at which the half-life period becomes one minute is in the range of 130° to 300° C. Examples of such radical forming agent are dicumyl peroxide, 2,5-dimethyl-2,5-di(t-butylperoxy)hexane, 2,5-dimethyl-2,5-di(t-butylperoxy)hexyne-3, α,α'-bis(t-butylperoxyisopropyl) benzene, dibenzoyl peroxide, di-t-butyl peroxide, and the like.

The amount of the radical forming agent to be blended is selected from the range of 0.0001 to 0.1 part by weight to 100 parts by weight of the sum of the linear polyethylene and branched low-density polyethylene. When the amount of the radical forming agent blended is less than 0.0001 part by weight, substantially no improvement is made on surface strength of the final film over the case where no radical forming agent is added. On the other hand, when the amount of the radical forming agent exceeds 0.1 part by weight, melt index becomes too low, giving rise to a possibility of causing break of the film in the course of film-forming process or causing surface roughening of the formed film.

In the present invention, there are provided no particular restrictions on the method for compounding the radical forming agent with the linear polyethylene or a blend of the linear polyethylene and branched low-density polyethylene (the linear polyethylene or such a blend may be referred to as "polyethylene resin" in the following descriptions), decomposing the radical forming agent and reacting it with the polyethylene resin.

For example, the following methods may be employed.

(1) Polyethylene resin, filler and radical forming agent are mixed, and the mixture is kneaded and reacted by using a kneader such as extruder, Banbury mixer or the like, and then pelletized, and the obtained pellets are blow-extruded into film.

(2) There is first prepared a master batch with a large content of the radical forming agent, that is, a master batch formed by blending a large among (usually about 5,000 to 10,000 ppm) of the radical forming agent with the polyethylene resin, melting and kneading the blend at a temperature which is above the melting point of the polyethylene resin and hardly causes a reaction between radical forming agent and the polyethylene resin, and pelletizing the melt kneaded blend. Then this master batch is blended with the linear polyethylene, branched low-density polyethylene and filler, and the blend is kneaded, pelletized and blow-extruded into film.

The radical forming agent may be blended as it is or after dissolving it in a solvent.

Reaction of the linear polyethylene and branched low-density polyethylene with the radical forming agent induces molecular coupling of the polyethylenes to produce a modified polyethylene resin (a modified linear polyethylene or a modified product of a blend of the linear polyethylene and branched low-density polyethylene) with an increased high-molecular weight component and a reduced melt index. This modified polyethylene resin has a greater tendency to orient in the transverse direction at the time of blow-extrusion than an unmodified linear polyethylene or an unmodified blend or the linear polyethylene and branched low-density polyethylene, and the film obtained by using such a modified polyethylene resin is markedly improved in tensile strength and impact strength when the film is subjected to a stretching treatment.

The crosslinking reaction by use of the radical forming agent is preferably carried out so that the resultantly obtained modified polyethylene resin will have a melt index at 190° C. ($MI_2$) of 2 g/10 min or less, preferably in the range of 0.1 to 1 g/10 and/or a flow ratio ($FR_2$) of 50 or above, preferably 50 to 120, while the $MI_2/MI_1$ ratio ($MI_1$ being melt index of the polyethylene resin before modification) will be 0.1 to 0.9, preferably in the range of 0.1 to 0.8 and the $FR_2/FR_1$ ratio ($FR_1$ being flow ratio of the polyethylene resin before modification) will be 1.1 or above, preferably in the range of 1.1 to 10 in view of film-forming properties and stretchability.

It is also preferred to compound a thermoplastic elastomer or an very-low-density ethylene/α-olefin copolymer in an amount of 40% by weight or less, preferably in the range of 5 to 30% by weight, with the linear polyethylene or a blend of the linear polyethylene and branched low-density polyethylene because such compounding improves strength properties (especially tear strength), film-forming properties and stretchability of the film.

The thermoplastic elastomer that can be compounded is the one in which the main polymer chain is basically composed of saturated bonds of hydrocarbons and double bonds are contained in pendant side chains.

Examples of such elastomer are copolymers of ethylene and/or α-olefins with diene monomers. Ethylene-propylene-diene terpolymer (EPDM) is most generally known. The type of diene usable here is not specified, but usually ethylidene norbornene, dicyclopentadiene and the like are used. Other examples of the elastomer are 1,2-addition polymers of polymerizable diene compounds, such as 1,2-polybutadiene, 1,2-polyisoprene, 3,4-polyisoprene and the like. It is possible to use copolymers thereof with ethylene or α-olefins as far as the diene monomer is polymerized by 1,2-addition.

The thermoplastic elastomer preferably has a Mooney viscosity measured at 100° C. ($ML_{1+4}(100° C.)$) of 5 to 100.

The very-low-density ethylene/α-olefin copolymer is usually a copolymer of ethylene and an α-olefin having 3 or more carbon atoms (this copolymer being hereinafter referred to as "very-low-density ethylene copolymer") which has a density of 0.910 g/cm³ or less, preferably in the range of 0.85 to 0.90 g/cm³.

Examples of α-olefins that can be copolymerized with ethylene are propylene, butene-1, pentene-1, hexene-1, 4-methylpentene-1 and the like. Among them, propylene and butene-1 are preferred.

The very-low-density ethylene copolymers usable in this invention include terpolymers obtained by polymerizing ethylene, α-olefins having 3 or more carbon atoms and non-conjugated dienes. Examples of the non-conjugated dienes are 1,4-hexadiene, dicyclopentadiene, ethylidene norbornene and the like.

The very-low-density ethylene copolymers can be produced by copolymerizing ethylene, α-olefins and, in some cases, non-conjugated dienes by using a Ziegler-Natta catalyst, especially a catalyst composed of a vanadium compound such as vanadium oxytrichloride oxytrichloride, vanadium tetrachloride, etc., and an organoaluminum compound.

The ethylene content in the very-low-density ethylene copolymer used in the present invention is preferably in the range of 40 to 90% by mole, and the content of α-olefin having 3 or more carbon atoms is preferably in the range of 10 to 60% by mole.

It is possible to use commercially sold very-low-density ethylene copolymers, which include NORSO-FLEX (FW 1600, FW 1900, MW 1920, SMW 2440, LW 2220, LW 2500, LW 2550, etc.) available from CdF Chimie E.P., NUC-FLX (DFDA 1137, DEDA 1138, DEFD 1210, DEFD 9042, etc.) available from Nippon Unicar Co. Ltd., TAFMER (A 4085, A 4090, P 0180, P 0480, etc.) available from Mitsui Petrochemical Co. Ltd., and JSR-EP (EP 02P, EP 07P, EP 57P, etc.) available from Japan Synthetic Rubber Co. Ltd.

The polyethylene resin may be incorporated with suitable additives such as heat stabilizer, ultra-violet stablizer, pigment, antistatic agent, fluorescent agent and the like in the usual ways.

Regarding the filler used in this invention, it is possible to use both inorganic and organic fillers. Examples of inorganic fillers usable in this invention are calcium carbonate, talc, clay, kaolin, silica, diatomaceous earth, magnesium carbonate, barium carbonate, magnesium sulfate, barium sulfate, calcium sulfate, aluminum hydroxide, zinc oxide, magnesium hydroxide, calcium oxide, magnesium oxide, titanium oxide, alumina, mica, asbestos powder, glass powder, shirasu balloon, zeolite, siliceous clay and the like. Among them, calcium carbonate, talc, clay, silica, diatomaceous earth and barium sulfate are preferred.

Examples of the organic fillers usable in this invention are cellulose powders such as wood powder, pulp powder and the like.

These inorganic fillers and organic fillers may be used either singly or in combination.

The filler used in this invention is preferably 30 μm or less, more preferably 10 μm or less, most preferably 0.8 to 5 μm in average particle size.

Too large particle size in injurious to denseness of pores in the stretched film, while too small particle size leads to bad dispersibility of the filler in the polyethylene resin and poor film-forming properties of the composition.

The filler is preferably subjected to a surface treatment for improving dispersibility in the polyethylene resin and stretchability of the film. Especially, treatment with a fatty acid or its metal salt gives a preferred result.

As for mixing ratios of the polyethylene resin and the filler, the filler is preferably mixed in an amount of 100 to 400 parts by weight to 100 parts by weight of the polyethylene resin.

When the amount of the filler is less than 100 parts by weight, pores are not sufficiently formed in the stretched film, resulting in an unsatisfactory porosity. When the amount of the filler exceeds 400 parts by weight, there result poor kneading characteristics, dispersibility and film-forming properties. Also, surface strength of the stretched film is lowered.

In the present invention, the particularly preferred mixing ratio of filler is 120 to 300 parts by weight to 100 parts by weight of the polyethylene resin.

In the present invention, a deodorizing agent or an automatic agent may be compounded into the polyethylene resin in order to provide the porous film with deodorizing properties or aromatic properties. As the deodorizing agent, a physical deodorizing agent utilizing physical adsorption due to its large specific area such as active carbon, silica gel, alumina gel, zeolite, etc., a chemical deodorizing agent utilizing a chemical reaction such as neutralization, oxidation, reduction, etc. such as organic salts of metals, a vegetable deodorizing agent containing wood extracts as a main ingredient, and a biodeodorizing agent utilizing biochemical activity of bacteria. As the aromatic agent, any type of agent which has perfume or fragrance can be used in the present invention.

The mixing ratio of the deodorizing agent or aromatic agent is preferably 0.1 to 40 parts by weight, more preferably 0.15 to 35 parts by weight based on 100 parts by weights of the polyethylene resin. When the mixing ratio is less than 0.1 parts by weight, deodorizing properties or aromatic properties to be provided with the porous film become insufficient, and when the mixing ratio exceeds 40 parts by weight, film-forming properties and mechanical properties of the film become impaired. The deodorizing agent and the aromatic agent may be used singly, or in combination to provide the porous film with both the deodorizing agent and the aromatic agent.

Blending of the polyethylene resin and the filler, and when necessary, the deodorizing agent or the aromatic agent, can be accomplished by placing and mixing them in an ordinary blender or mixer, but the following method is advantageously in respects of mixing performance, dispersion of the filler and film-forming.

The preferred form of the polyethylene resin used in the present invention is powder. Usually 10 to 150 mesh powder is used. 20 to 60 mesh powder is especially preferred for the reason of better uniformity and handling convenience.

Various types of mixer such as drum mixer, tumbling mixer, ribbon blender, Henschel mixer, super mixer and the like can be used in this invention, but it is preferred to use a high-speed stirring type mixer such as Henschel mixer. For kneading of the mixture, there can be used the conventional kneading machines such as ordinary screw extruder, double-screw extruder, mixing rolls, Banbury mixer, double-screw kneader and the like.

Regarding the kneading of the deodorizing agent or the aromatic agent, the following two methods may be employed. One is that in which these agents are first mixed together with the ethylene resin and the filler in a high-speed stirring type mixer such as Henschel mixer, then the mixture is melt-kneaded in a machine usually employed, such as a single-screw extruder, a double-screw extruder, a mixing roll and a Banbury mixer. The other is that in which these agents is dry blended with a compound comprising the ethylene resin and the filler in the film-forming process described below. The latter method is preferred because the adsorption of moisture by strand water-cooling during the kneading of the compound can be avoided as well as the heat history can be reduced by one time compared with the former method, resulting in preventing the deodorizing agent and the aromatic agent from deterioration in their properties. From the view point of uniform dry-blend, the deodorizing agent or the aromatic agent is preferred to be blended in a form of master batch pellet.

In the present invention, a blend of polymers, fillers, radical forming agents and other required components is blow-extruded into an unstretched film, and then the unstretched film is stretched in the machine direction (film take-up direction) to obtain a stretched film.

Blow-extrusion is performed at a blow-up rate of 2 to 8, preferably 3 to 6, and a frost line height of 2 to 50 times, preferably 5 to 20 times the die diameter. When the blow-up ratio is less than 2, the produced film proves to be low in tensile strength and impact strength. When the blow-up ratio is higher than 8, the bubble stability is deteriorated. Also, when the frost line height is less than 2 times the die diameter, the obtained film is poor in tensile strength, and when greater than 50 times the die diameter, the bubble stability is lowered.

The thus obtained unstretched film is then uniaxially stretched. Usually roll stretching is preferably employed for performing uniaxial stretching of the film, but it is possible to employ a tubular stretching method in which stretching is made more strongly in one direction (film take-up direction). Stretching may be conducted in one stage or in two or more stages.

In the present invention, uniaxial stretching is performed in the machine direction at a temperature which is in the range from MP - 100° to MP - 20° C., wherein MP being the melting point of the resin composition, and a stretch ratio of 1.2 to 8 times the original length.

The preferred stretching temperature is in the range from MP - 50° to MP - 90° C. When stretching temperature is below the range, there may take place non-uniform stretching of the film, and when stretching temperature is above the range, film porosity is greatly reduced. Preferred stretch ratio is in the range of 1.5 to 4 times the original length. When the stretch ratio is less than 1.2 times, there can not be obtained the desired effect of stretching, resulting in unsatisfactory porosity and tensile strength of the film. When the stretch ratio exceeds 8 times, the stretched film has excessive molecular orientation in the machine direction, which deteriorates surface strength of the film.

Dimensional stability of films can be obtained by conducting a heat treatment on the films after uniaxial stretching at a temperature from MP - 70° to MP - 10° C. It is also possible to perform a known surface treatment such as corona treatment, flame treatment, etc.

The advantageous characteristics of the thus obtained porous film of the present invention is summarized below.

i) Film properties

Anisotropy of uniaxially stretched film is greatly improved in comparison with that of the conventional uniaxailly stretched films. This leads to an improvement in balance of qualities in the machine and transverse directions.

Especially tensile strength in the transverse direction (direction orthogonal to the stretched direction) is enhanced.

ii) Porosity

The film of this invention is free of non-uniformity of stretching and also has uniform interconnected pores, so that it has very excellent moisture and gas permeability. It is also has a excellent water pressure resistance.

iii) Processability

Heat-seal strength of the film is improved.

iv) Economy

A marked reduction of production cost can be realized as it is possible to decrease the amount of liquid or waxy hydrocarbon polymers blended and to reduce the film thickness.

v) Incineration

The film of the present invention can be easily incinerated without generating any harmful gases.

The film of the present invention can be applied to a wide variety of use because of the above advantages. For instance, it can be used for clothing (waterproof clothing articles, rain apparel, etc.), cell separators, filter media (for cleaning, mist removal, treatment of industrial waste water, etc.), medical supplies, etc. by making use of its excellent moisture permeability.

The present invention will be described in further detail by showing the examples thereof, but it is to be understood that these examples are merely intended to be illustrative and not to be construed as limiting the scope of the invention.

EXAMPLE 1

90 parts by weight of 40 mesh powder of a linear low-density polyethylene (melt index (MI): 1.0 g/10 min; density: 0.921 g/cm$^3$; flow ratio: 19; copolymerized substance: butene-1; amount copolymerized; 10% by weight; melting point: 120° C.), 10 parts by weight of 40 mesh powder of a branched low-density polyethylene (MI: 2.0 g/10 min; density; 0.924 g/cm$^3$; flow ratio: 35), 0.05 part by weight of 2,6-di-t-butylparacresol and 0.05 part by weight of calcium stearate were mixed under stirring in a Henschel mixer. Then 0.02 part by weight of 2,5-dimethyl-2,5-di(t-butylperoxy)hexyne-3 was added thereto and mixed under stirring. Further, 200 parts by weight of calcium carbonate (average particle size: 1.2 μm; subjected to fatty acid treatment) was added and mixed under stirring.

The resultantly prepared mixture was kneaded by a double-screw kneader DSM-65 (mfd. by Nippon Steel Co., Ltd.) and pelletized.

This pelletized product was blow-extruded into a 65 μm thick by a 40 mmΦ extruder under the following extruding conditions:

| | |
|---|---|
| Cylinder temp. | 170–190–210–230° C. |
| Head and die temp. | 200° C. |
| Die diameter (D) | 100 mm |
| Take-up rate | 8 m/min |
| Blow ratio | 3.0 |
| Frost line height (FLH) | 700 mm |
| Lay-flat width | 471 mm |

The thus obtained film was slit in the film take-up direction and uniaxailly stretched by a roll stretcher under the following conditions:

| | |
|---|---|
| Stretching temp. | 50° C. |
| Stretch ratio | 2.5 times |
| Stretching rate | 11.0 m/min |

The stretched film was porous and sufficiently whitened. It was also free of non-uniformity of stretching and had beautiful surface appearance.

The performance qualities of this film are shown in Table 2.

The methods for measurement of the quality evaluation items in Table 2 were as described below.

1) Stretching properties
   - ⊚: No break in the film. Uniformly stretched.
   - ○: No break in the film. Almost uniformly stretched.
   - Δ: No break in the film. Slight degree of non-uniformity of stretching.
   - ×: Frequent break in the film or a high degree of non-uniformity of stretching.

2) Tensile strength and elongation
Measured according to ASTM 882-64T. Sample film size: 20 mm width and 50 mm length; rate of pulling: 50 mm/min.

3) Moisture permeability
Measured according to ASTM E26-66(E).

4) Softness
Judged by hand feeling according to the following criterion:
   - ⊚: Very soft
   - ○: Soft
   - Δ: Rather soft
   - ×: Hard 5) Film puncture strength (surface strength)
A 100 m/m×100 m/m square sample was cut from the film, and this sample film was fixed from its upper and lower sides by a clamping ring having an inner diameter of 80 m/m.

A 20 mmΦ diameter rod plunger having a hemispherical top of 10 mm radius was set in a tensile tester and pressed against the fixed sample film at a crosshead speed of 500 mm/min.

The surface strength of the film was expressed by the maximum tensile strength determined by the above operation.

6) Bending resistance (mm)
Measured by a 45° cantilever method according to JIS L1018-1977. Measurement was made at 20° C. and 65% RH.

EXAMPLES 2-5

Porous films were obtained in the same way as Example 1 except that the stretching temperature and stretch ratio were changed as shown in Table 1, and the qualities of these films were evaulated by the methods described in Example 1. The results are shown in Table 2.

EXAMPLES 6-7 and COMPARATIVE EXAMPLES 1 and 4

Porous films were obtained in the same way as Example 1 except for change of the mixing ratio of polymer and filler, and the qualities of the films were evaluated according to the methods of Example 1. The results are shown in Table 2.

COMPARATIVE EXAMPLE 2-3

Porous films were obtained in the same way as Example 1 except that the blow-extrusion condition were changed, and the film qualities were evaluated to the methods of Example 1. The results are shown in Table 2.

COMPARATIVE EXAMPLE 5

A film was made in the same way as Example 3 without adding 2,5-dimethyl- 2,5-di(t-butyloxy)hexyne-3. The obtained film had a large degree of non-uniformity of stretching and was unsuited for practical use. The results are shown in Table 2.

COMPARATIVE EXAMPLE 6

The same linear low-density polyethylene, branched low-density polyethylene and filler as used in Example 1 were mixed by stirring in a Henschel mixer in the compositional ratios shown in Table 1, and this mixture was further added and mixed by stirring with 15 parts by weight of dipentaerythritol octanoate. By using the resulting composition, a porous film was produced in the same way as Example 1 except for use of the blowing conditions and stretching conditions shown in Table 1. The qualities of the obtained film were evaluated in the same manner as in Example 1. The evaluation results are shown in Table 2.

COMPARATIVE EXAMPLE 7

The same linear low-density polyethylene, branched low-density polyethylene and filler as used in Example 1 were mixed under stirring in a Henschel mixer in the compositional ratios shown in Table 1, and the mixture was further added and mixed under stirring with 20 parts by weight of a polyhydroxy saturated hydrocarbon (produced by the method of Reference Example 1 in Japanese Patent Application Laid-Open (KOKAI) No. 136334/84). By using the thus obtained composition, a porous film was produced in the same way as Example 1 except for use of the blowing conditions and stretching conditions shown in Table 1. The film qualities were evaluated according to the same methods as in Example 1, and the results are shown in Table 2.

0.05 part by weight of calcium stearate were mixed under stirring in a Henschel mixer. Then 0.02 part by weight of 2,5-dimethyl-2,5-di(t-butylperoxy)hexyne-3 was added thereto and mixed under stirring. Further, 200 parts by weight of calcium carbonate (average particle size: 1.2 μm; subjected to fatty acid treatment) and an amount given in Table 4 of a deodorizing agent or an aromatic agent listed in Table 3 were added and mixed under stirring.

The resultantly prepared mixture was kneaded by a double-screw kneader DSM-65 (mfd. by Nippon Steel Co., Ltd.) and granulated.

This granular product was blow-extruded into a 65 μm thick by a 40 mmΦ extruder under the following extruding conditions:

TABLE 1

| | Composition (parts by weight) | | | Thickness of blown film (μm) | Blow conditions | | Stretching conditions | |
|---|---|---|---|---|---|---|---|---|
| | Linear polyethylene | Branched polyethylene | Filler | | Blow-up ratio | FLH/D | Temp. (°C.) | Stretch ratio |
| Example | | | | | | | | |
| 1 | 90 | 10 | 200 | 65 | 3.0 | 7 | 50 | 2.5 |
| 2 | 90 | 10 | 200 | 65 | 3.0 | 7 | 60 | 2.2 |
| 3 | 90 | 10 | 200 | 65 | 3.0 | 7 | 50 | 3.0 |
| 4 | 90 | 10 | 200 | 65 | 3.0 | 7 | 40 | 2.5 |
| 5 | 90 | 10 | 200 | 65 | 3.0 | 7 | 80 | 2.5 |
| 6 | 90 | 10 | 250 | 65 | 3.0 | 7 | 50 | 2.5 |
| 7 | 100 | 0 | 200 | 65 | 3.0 | 7 | 50 | 2.5 |
| Comparative Example | | | | | | | | |
| 1 | 90 | 10 | 90 | 65 | 3.0 | 7 | 50 | 2.5 |
| 2 | 90 | 10 | 200 | 65 | 1.5 | 7 | 50 | 2.5 |
| 3 | 90 | 10 | 200 | 65 | 3.0 | 1.5 | 50 | 2.5 |
| 4 | 30 | 10 | 200 | 65 | 3.0 | 1.5 | 50 | 2.5 |
| 5 | 90 | 10 | 200 | 65 | 3.0 | 7 | 50 | 3.0 |
| 6 | 90 | 10 | 180 | 65 | 3.0 | 4 | 60 | 2.5 |
| 7 | 90 | 10 | 180 | 65 | 2.5 | 4 | 80 | 2.0 |

TABLE 2

| | Stretchability | Thickness of stretched film (μm) | Strength and elongation (MD/TD) | | Moisture permeability (g/m²/24 hr) | Softness | Surface strength (kg)/elongation (mm) | Bending resistance (mm) MD/TD |
|---|---|---|---|---|---|---|---|---|
| | | | Strength (kg/cm²) | Elongation (%) | | | | |
| Example | | | | | | | | |
| 1 | ◎ | 45 | 120/65 | 203/520 | 3900 | ◎ | 1.75/42 | 26/25 |
| 2 | ◎ | 45 | 113/76 | 246/530 | 2880 | ◎ | 1.83/43 | 27/26 |
| 3 | ◎ | 40 | 138/53 | 229/495 | 4420 | ◎ | 1.61/40 | 20/19 |
| 4 | ◎ | 45 | 128/59 | 195/533 | 4130 | ◎ | 1.72/41 | 24/23 |
| 5 | ◎ | 45 | 115/72 | 214/508 | 3240 | ◎ | 1.77/44 | 27/25 |
| 6 | ◎ | 45 | 103/58 | 189/493 | 4320 | ○ | 1.63/37 | 24/22 |
| 7 | ◎ | 45 | 128/53 | 196/535 | 4050 | ◎ | 1.76/43 | 26/24 |
| Comparative Example | | | | | | | | |
| 1 | X | 45 | 152/98 | 233/595 | 1250 | △ | 1.96/48 | 29/27 |
| 2 | ◉ | 45 | 153/36 | 175/615 | 3850 | ○ | 1.44/33 | 26/24 |
| 3 | ◎ | 45 | 149/35 | 181/608 | 3920 | ○ | 1.42/32 | 25/24 |
| 4 | △ | 45 | 101/37 | 180/425 | 2180 | ◎ | 1.40/30 | 27/26 |
| 5 | X | — | — | — | — | △ | — | — |
| 6 | ◉ | 45 | 133/47 | 235/560 | 4350 | ◎ | 1.32/38 | 22/20 |
| 7 | ○ | 50 | 127/52 | 273/574 | 4680 | ◎ | 1.36/42 | 23/22 |

EXAMPLES 8-24

90 parts by weight of 40 mesh powder of a linear low-density polyethylene (melt index (MI): 1.0 g/10 min; density: 0.921 g/cm³; flow ratio: 19; copolymerized substance butene-1; amount copolymerized; 10% by weight; melting point; 120° C.), 10 parts by weight of 40 mesh powder of a branched low-density polyethylene (MI: 2.0 g/10 min; density: 0.924 g/cm³; flow ratio: 35), 0.05 part by weight of 2,6-di-t-butyl-paracresol and

| | |
|---|---|
| Cylinder temp. | 170-190-210-230° C. |
| Head and die temp. | 200° C. |
| Die diameter (D) | 100 mm |
| Take-up rate | 8 m/min |
| Blow ratio | 3.0 |
| Frost line height (FLH) | 700 mm |
| Lay-flat width | 471 mm |

The thus obtained film was slit in the film take-up direction and uniaxially stretched by a roll stretcher under the following conditions:

| Stretching temp. | 50° C. |
| --- | --- |
| Stretch ratio | 2.5 times |
| Stretching rate | 11.0 m/min |

The stretched film was porous and sufficiently whitened. It was also free of non-uniformity of stretching and had beautiful surface appearance.

The performance qualities of this film are shown in Table 4.

The measurement of the stretching properties, tensile strength and elongation, moisture permeability, softness, and film puncture strength (surface strength) were carried out according to the methods in described in Example 1.

The methods for measurement of the other properties in Table 4 ware as described below.

1) Gas permeability
Measured according to JIS P8117.
2) Residual gas concentration
① Procedure A test film which was cut from each of the films obtained in Examples 8-24 in a given size was placed in a odor test bag of a given volume, then the bag was heat-sealed. A given amount of an air-based ammonia gas of a given concentration was injected into the sealed bag. The bag was allowed to stand at room temperature (23° C.) and after one hour, the residual gas concentration was determined by using a gas detector tube.

② Conditions for measurement
i) Reagent and equipment

Odor test bag: Product of Oil Odor-Air Service Co. Ltd.
Ammonia: Standard gas available from Taiyo Sanso Co. Ltd.
Gas detector tube: Product of Gastec Co. Ltd.
ii) Sample size
Odor test bag: 3 liters
Film: 20 cm × 20 cm
iii) Injected ammonia gas (initial condition)
Concentration: 100 ppm
Injected amount: 3 liters
Temperature: 23° C.

TABLE 3

| | Trade Name | Maker | Type |
| --- | --- | --- | --- |
| A | Fresh-Shiraimatsu FS-500S | Shiraimatsu Shinyaku Co. Ltd. | Vegetable deodorizing agent mainly comprising vegetable extract. |
| B | Daimushu PEM3000 | Dainichiseika Kogyo Co. Ltd. | Chemical deodorizing agent based on organic acid. |
| C | Super Clean WX-100 | Kokonoe Co. Ltd. | Vegetable deodorizing agent based on softwood dry distillate. |
| D | Cera White | Titan Kogyo Co. Ltd. | $ZnO \cdot TiO_2 \cdot H_2O$ type chemical deodorizing agent. |
| E | DEOCEPT PEM-17137 | Daicel Chemical Ind. Ltd. | Chemical deodorizing agent based on inorganic metal salt. |
| F | KD211G | Rasa Kogyo Co. Ltd. | Chemical deodorizing agent based on inorganic metal salt. |
| G | K-FResh | Teikokukako Co. Ltd. | Chemical deodorizing agent based on inorganic metal salt. |
| H | PERFUME O-1107 | Soda Koryo Co. Ltd. | Perfume |

TABLE 4

| Example | Deodorizing agent or aromatic agent Type | Amount (part by weight) | Stretch-ability | Thickness of stretched film (μm) | Strength (kg/cm²) (MD/TD) | Elongation (%) (MD/TD) | Moisture permeability (g/m²/24 hr) |
| --- | --- | --- | --- | --- | --- | --- | --- |
| 8 | A | 10 | ◎ | 45 | 120/65 | 200/518 | 3940 |
| 9 | B | 10 | ◎ | 45 | 118/64 | 198/520 | 3900 |
| 10 | C | 10 | ◎ | 45 | 117/64 | 196/510 | 4010 |
| 11 | D | 10 | ◎ | 45 | 119/65 | 197/520 | 3890 |
| 12 | E | 10 | ◎ | 45 | 118/63 | 195/510 | 4040 |
| 13 | F | 5 | ◎ | 45 | 118/65 | 195/530 | 3920 |
| 14 | F | 10 | ◎ | 45 | 116/63 | 190/515 | 3980 |
| 15 | F | 20 | ◎ | 45 | 116/64 | 189/510 | 4000 |
| 16 | F | 30 | ◎ | 45 | 115/60 | 180/489 | 4150 |
| 17 | G | 1 | ◎ | 45 | 120/66 | 201/525 | 3880 |
| 18 | G | 5 | ◎ | 45 | 118/63 | 199/510 | 3920 |
| 19 | G | 10 | ◎ | 45 | 119/65 | 200/525 | 3980 |
| 20 | G | 20 | ◎ | 45 | 115/64 | 190/515 | 4030 |
| 21 | G | 30 | ○ | 45 | 112/61 | 188/500 | 4140 |
| 22 | G | 30 | ○ | 45 | 111/60 | 185/505 | 4140 |
| 23 | G | 40 | △ | 45 | 108/60 | 180/500 | 4150 |
| 24 | H | 10 | ○ | 45 | 120/66 | 200/530 | 3950 |

| Example | Air permeability (sec/100 cc) | Softness | Surface strength (kg)/ elongation (mm) | Residual gas concentration (ppm) | Blending method |
| --- | --- | --- | --- | --- | --- |
| 8 | 720 | ◎ | 1.74/41 | 52 | kneading |
| 9 | 730 | ◎ | 1.75/43 | 45 | kneading |
| 10 | 700 | ◎ | 1.73/40 | 60 | kneading |
| 11 | 740 | ◎ | 1.72/39 | 56 | kneading |
| 12 | 700 | ◎ | 1.70/38 | 40 | kneading |
| 13 | 700 | ◎ | 1.71/39 | 73 | kneading |
| 14 | 740 | ◎ | 1.72/40 | 30 | kneading |
| 15 | 700 | ◎ | 1.80/48 | 21 | kneading |
| 16 | 680 | ○ | 1.81/50 | 16 | kneading |
| 17 | 760 | ◎ | 1.76/40 | 85 | kneading |
| 18 | 750 | ◎ | 1.74/41 | 72 | kneading |
| 19 | 730 | ◎ | 1.75/43 | 28 | kneading |
| 20 | 700 | ◎ | 1.70/40 | 19 | kneading |

TABLE 4-continued

| | | | | | |
|---|---|---|---|---|---|
| 21 | 675 | ○ | 1.68/38 | 10 | kneading |
| 22 | 670 | ○ | 1.69/37 | 2 | dry blend |
| 23 | 650 | △ | 1.60/35 | 0 | kneading |
| 24 | 725 | ○ | 1.72/40 | aromatic odor | kneading |

What is claimed is:

1. A porous film having a thickness of 90 μm or less, which is obtained from a composition comprising a linear polyethylene, 0 to 50 parts by weight of a branched low-density polyethylene based on 50 to 100 parts by weight of said linear polyethylene, a filler and a radical forming agent, and has a bending resistance of 50 mm or less in both the machine and transverse directions, a moisture permeability of 1500 g/m².24 hr or above, and a surface strength satisfying the following relation (I):

$$\text{Surface strength (kg)} \geq 35 \times \text{film thickness (mm)} \quad (I).$$

2. A porous film according to claim 1, wherein said linear polyethylene has a density of 0.910 to 0.965 g/cm³, a melt index of 20 g/10 min or less and a flow ratio of 70 or less.

3. A porous film according to claim 1, wherein the amount of said radical forming agent is 0.0001 to 0.1 part by weight based on 100 parts by weight of the sum of said linear polyethylene and said branched low-density polyethylene.

4. A porous film according to claim 3, wherein the temperature at which the half-life period of said radical forming agent is one minute is in the range of 130° to 300° C.

5. A porous film according to claim 1, wherein the amount of said filler is 100 to 400 parts by weight based on 100 parts by weight of the sum of said linear polyethylene and said branched low-density polyethylene.

6. A porous film according to claim 5, wherein said filler is an inorganic filler or an organic filler having an average particle size of 30 μm or less.

7. A porous film according to claim 1, wherein said composition further comprises a thermoplastic elastomer or a very-low density ethylene/α-olefin copolymer in an amount of not more than 40% by weight of the amount of said linear polyethylene.

8. A porous film according to claim 7, wherein said thermoplastic elastomer is a copolymer of ethylene and/or an α-olefin with a diene monomers.

9. A porous film according to claim 7, wherein said very-low density ethylene/α-olefin copolymer is a copolymer of ethylene and an α-olefin having 3 or more carbon atoms and has a density of 0.910 g/cm³ or less.

10. A porous film according to claim 1, wherein said composition further comprises a deodorizing agent or an aromatic agent in an amount of 0.1 to 40 parts by weight based on 100 parts by weight of the sum of said linear polyethylene and said branched low-density polyethylene.

11. A porous film according to claim 1, wherein said composition comprises 100 to 50 parts by weight of said linear polyethylene having a density of 0.91 to 0.965 g/cm³, a melt index of 20 g/10 min or less and a flow ratio of 70 or less; 0 to 50 parts by weight of a branched low-density polyethylene having a melt index of 20 g/10 min or less and a flow ratio of 70 or less; 0.0001 to 0.1 part by weight of a radical forming agent; and 100 to 400 parts by weight of a filler, said amounts of said radical forming agent and said filler being based on 100 parts by weight of the sum of said linear polyethylene and said branched low-density polyethylene.

* * * * *